March 19, 1929.  H. P. HOLLNAGEL  1,706,161
ILLUMINATING UNIT
Filed Nov. 13, 1926
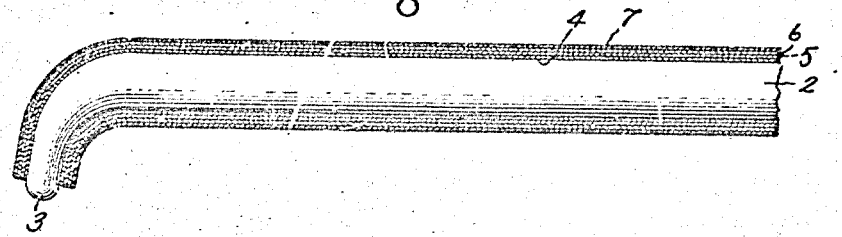
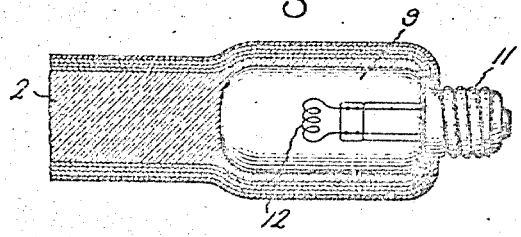
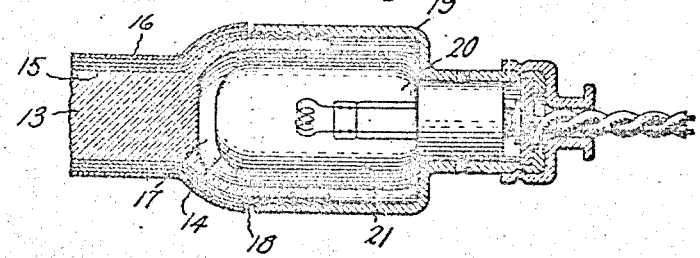
Inventor:
Herbert P. Hollnagel,
by
His Attorney.

Patented Mar. 19, 1929.

1,706,161

UNITED STATES PATENT OFFICE.

HERBERT P. HOLLNAGEL, OF SWAMPSCOTT, MASSACHUSETTS, ASSIGNOR TO GENERAL ELECTRIC COMPANY, A CORPORATION OF NEW YORK.

ILLUMINATING UNIT.

Application filed November 13, 1926. Serial No. 148,166.

My invention relates to an illuminating unit of a type specially adapted for dental work, surgical work, radio-therapeutic work and the like which type of device is sometimes called an applicator.

It is an object of my invention to construct the device so that the rays of light from a suitable source, such as an incandescent electric lamp, (which lamp forms part of the instrument), pass through a light-transmitting element, such as a long quartz rod, from one end of which element the light is emitted. In such a device the internal reflection is utilized. In order to prevent any loss of light through the sides of the element before it reaches the end, I provide a coat of any suitable light-reflecting material such as the metal silicon, silver, magnalium or other suitable material having a high index of reflection. Such a coat prevents any light being scattered outside of the element through the walls thereof whereby a maximum amount of illumination may be had at the point desired.

It is also an object of my invention to provide a casing for the device within which the rod and an electric lamp serving as a light source are contained. It is also an object to provide a socket for the lamp, a cavity being provided within the rod element itself and within which the lamp is located. Applicators of the type contemplated may of course be made in different forms. In most instances the transparent element has one or more curves along which curves the beam of light has to be transmitted. This beam of light, in addition to the visible rays, contains both ultraviolet and infra red rays, all of which are internally reflected at the proper angles depending upon the index of refraction of the transmitting material for the particular rays. If an applicator were made without any protecting coat some of the light would be scattered through the sides of the glass or quartz and this loss is greatly increased when particles of matter adhere to or are condensed upon the surface of the transparent element, due for example to handling or condensation or to contact with wet bodies. The same thing results if the applicator is placed against tissue and particularly moist tissue. Under such conditions the radiations are transmitted through the walls of the applicator and lost and in some cases are harmful and to prevent this by the application of a metal coat is an object of this invention. The various rays which traverse the applicator are usually of different wave lengths. As the index of refraction of these rays is different for each different length, the angle within which total internal reflection takes place is also different. If total reflection could be always assured within the quartz rod, the coating of the rod on the outside with a reflecting material might not be necessary, but inasmuch as this is not the case for the reasons pointed out above, applicant has found it advantageous to coat the quartz with one of the metals indicated. Ordinarily, silver is to be preferred as a coat for the transparent element but if the applicator is to be used for the transmission of ultraviolet light a magnalium or silicon coating would be preferred. However any coat of metal having a high reflectivity in the ultraviolet region of the spectrum may be used instead of magnalium or silicon. Magnalium is an alloy of magnesium and aluminum, the composition of which alloy is about 69% aluminum and 31% of magnesium.

The details of the invention will be more clearly understood from the following specification, claims and drawings: Fig. 1 shows the forward portion of the transparent rod and also shows in section the reflecting coat of material together with its protective backing and also the outer case.

Fig. 2 shows the stock end of the device enlarged and in section.

Fig. 3 shows a modified form of the device.

Referring more in detail to Fig. 1, it will be seen that the transparent element 2, which may be of quartz or other suitable material is formed with an angle and terminates in a rounded forward end 3 from which end the beam of light or radiation is emitted. The rod is provided with a metal coating of chemically deposited silver, for example; the first coat is reenforced, for example, by an electrolytically deposited layer 5 of silver which layer in turn is reenforced, for example by a layer of copper 6. The outer casing 7 of the device may be of any suitable material such as rubber bakelite or the like.

Referring to Fig. 2, it will be seen that the quartz element 2 is formed with a cavity within which is located the electric lamp 9. This element 2 in Fig. 2 is a continuation of the element 2, Fig. 1. Lamp 9 is provided with the usual terminal construction which is adapted to fit in the ordinary type of socket.

It will be seen therefore that with a device of the foregoing construction, when a current is flowing in the filament 12 of the lamp a beam of light will be transmitted along the length of the rod which beam will be reflected and refracted around the curve and out of the terminal 3 of the device.

In the form of construction shown in Fig. 3 the quartz element 13 does not extend as far along the side of the lamp 14 as is the case in the construction shown in Fig. 2. As shown in this figure the metallic coating 15 as well as the outer casing 16 are cut off just beyond the flaring portion of the device just opposite the base of cavity 17. Beyond the casing and beyond the metallic coat the device is provided with a set of threads 18 along the terminal end of the quartz 13. These threads are adapted to engage with corresponding threads on the inside of the lamp socket 19 within which socket the lamp 20 is held. The lamp 20 is also coated with a metallic reflecting surface 21 similar to that provided along the length of the rod 13. This reflecting coat serves to increase the amount of light or other radiation by transmitting along the rod 13 the radiation which would otherwise be lost.

It will be seen therefore, that I provide an improved applicator which is more efficient than devices of this sort heretofore provided and which is free from any danger of producing any harmful effects as a result of the escape of the light along the side of the instrument.

It will be understood that by light is meant radiation in its broadest sense. It will be understood that while I have described my invention in connection with certain specific forms of embodiment I do not wish to be limited to these particular forms inasmuch in view of the disclosure, variations will readily suggest themselves to those versed in the art without departing from the spirit of the invention or from the scope of the claims contained herein.

What I claim as new and desire to secure by Letters Patent of the United States, is,—

1. In combination with a source of ray radiation a quartz rod for conveying the rays from the source, said rod being covered with a coat of a metallic ray reflecting material, the forward end of said rod being uncovered whereby the radiation may be emitted therefrom and the opposite end of the rod forming a cavity for receiving the source of radiation.

2. In combination with a source of rays, a quartz rod through which the rays may travel, said rod being covered except at its ends with a material having high reflecting properties with respect to the rays, one end of the rod constructed to emit the rays from the device and the other end formed with a cavity to receive the source of the rays.

3. In combination with a source of rays, a quartz rod through which the rays may travel, said rod being covered except at its ends with a material having high reflecting properties with respect to the rays, one end of the rod constructed to emit the rays therefrom and the other end formed with a cavity to receive the rays from said source and a cap constructed to fit over the said cavity and serving as a support for the source of rays.

4. An illuminating device comprising a source of light in the form of an electric lamp and a quartz element located in operative relation to the said source whereby a beam of light may be transmitted through said element to a distant point from the light source, said element being provided with a coat of metallic material completely enclosing the beam to within proximity of the end of the element, said coat serving as a reflector for said beam, the other end of the element being formed with a cavity for receiving the light source and a cap for the cavity constructed to be fitted thereover and serving as a support for the light source, said lamp being provided with a band of reflecting material around its sides for increasing the volume of light transmitted to the rod.

In witness whereof, I have hereunto set my hand this second day of November, 1926.

HERBERT P. HOLLNAGEL.